United States Patent [19]

Balsarotti et al.

[11] Patent Number: 5,305,636
[45] Date of Patent: Apr. 26, 1994

[54] PLATE BRAKE TESTER AND METHOD

[75] Inventors: Steven C. Balsarotti, Crestwood; Nicholas J. Colarelli, III, Creve Coeur, both of Mo.

[73] Assignee: Hunter Engineering Company, Bridgeton, Mo.

[21] Appl. No.: 17,640

[22] Filed: Feb. 12, 1993

[51] Int. Cl.⁵ ............................................. G01L 5/28
[52] U.S. Cl. ........................................ 73/122; 73/121
[58] Field of Search ............................ 73/122, 121; 364/426.01

[56] References Cited

U.S. PATENT DOCUMENTS

| | | | |
|---|---|---|---|
| 4,011,751 | 3/1977 | Weiss et al. | 73/122 |
| 5,083,456 | 1/1992 | Colarelli, III | 73/122 |
| 5,129,260 | 7/1992 | van der Avoird | 73/122 |
| 5,230,242 | 7/1993 | Colarelli, III | 73/122 |

Primary Examiner—Hezron E. Williams
Assistant Examiner—Mort Smith
Attorney, Agent, or Firm—Polster, Lieder Woodruff & Lucchesi

[57] ABSTRACT

A plate brake tester for testing the adequacy of the brakes of a vehicle, particularly suited for testing the brakes of multi-axle vehicles, includes weight bearing plates suitably sized to receive thereon wheel/tire assemblies of a vehicle as the vehicle is driven over the plates. The plates have sensors associated therewith for sensing not only the brake force applied by each wheel/tire assembly, but also for directly sensing the dynamic weight of the wheel/tire assembly on each plate during braking. The adequacy of the brakes is determined from the brake force and the directly sensed dynamic weight. At least some of the sensors are preferably dual axis load cells, each dual axis load cell having one output representing vertical force applied to that plate and having a second output representing horizontal force applied to that plate, the horizontal force being the braking force from the wheel/tire assembly disposed on that plate. The maximum brake force and corresponding dynamic weight is used to determine adhesion utilization for each axle. The deceleration of the vehicle is also determined and the value of maximum deceleration is used as a preferred value of adhesion utilization for each axle. The preferred value of adhesion utilization is scaled, if desired, to take into account loading of the vehicle under test.

22 Claims, 3 Drawing Sheets

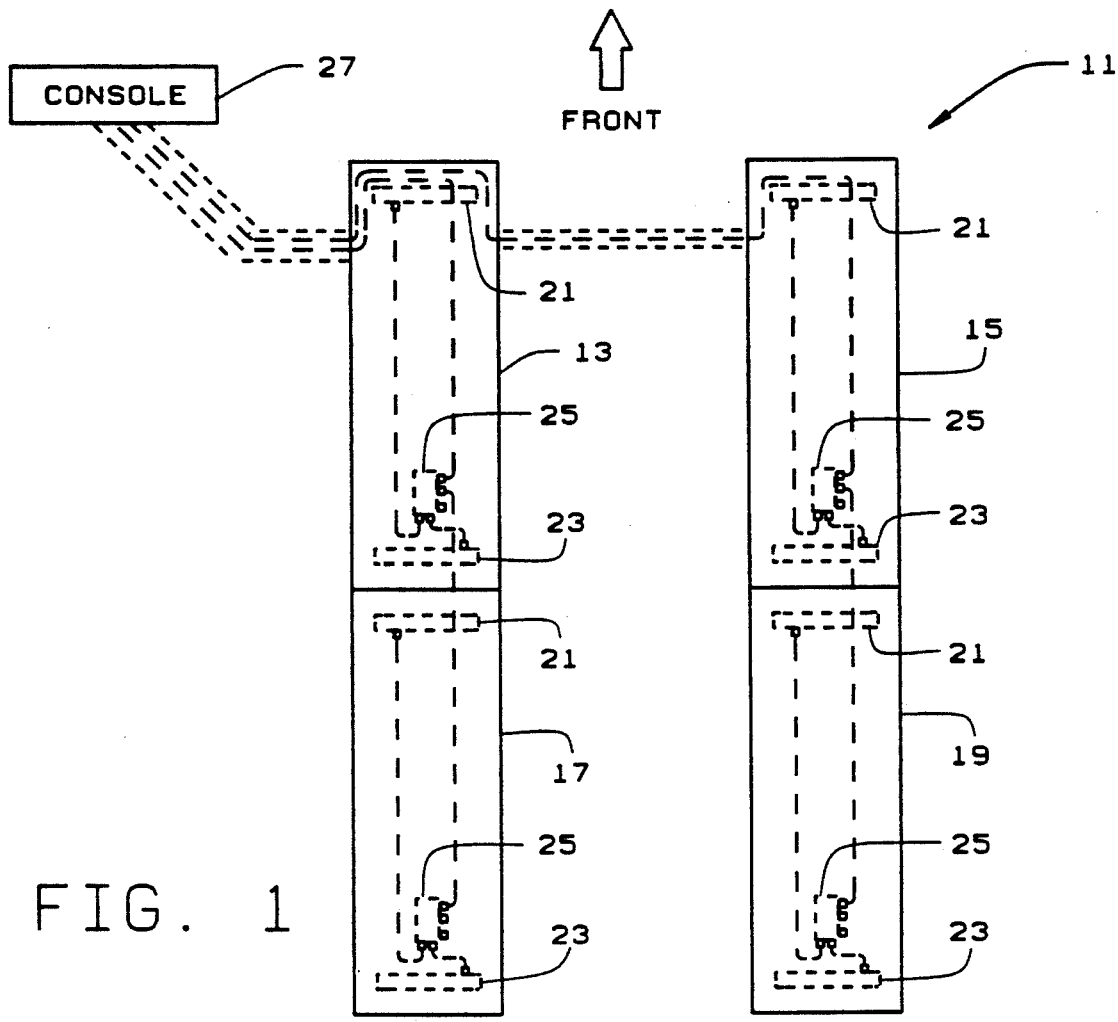
FIG. 1
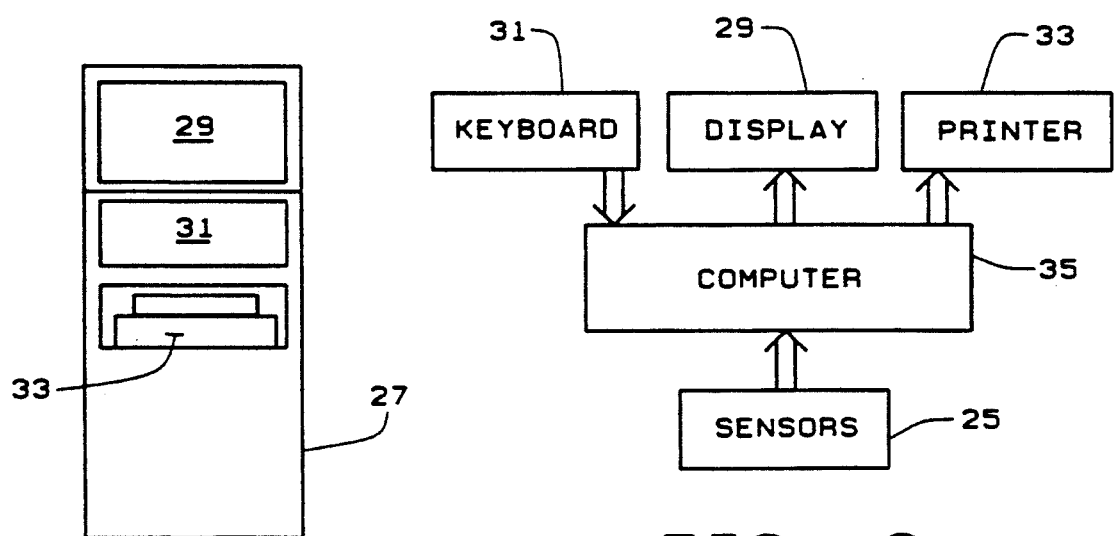
FIG. 2
FIG. 3

PLATE BRAKE TESTER AND METHOD

BACKGROUND OF THE INVENTION

This invention relates to brake testers for vehicles, and more particularly to plate brake testers particularly suited for testing the brakes of multi-axle vehicles.

Faulty or inadequate brakes are a significant cause of vehicle accidents. Moreover, the faulty condition of the brakes is often not apparent during routine use of the brakes. The operator of the vehicle is usually not aware, until it is too late, that the vehicle's brakes are deficient.

Furthermore, many brake defects are not readily apparent during a visual inspection of the brakes. Only a test simulating actual stopping conditions can detect many brake defects.

When the brakes of a vehicle are applied, a retarding force is generated between the tire and the surface on which the tire is riding. When this force becomes greater than the weight on that wheel multiplied by the coefficient of friction between the tire and the surface, the wheel will begin to lock up and stop rolling. The retarding force of a wheel just before lockup is greater than the retarding force of the same wheel just after lockup. In addition, a locked wheel loses its ability to maintain lateral forces, which makes handling very difficult.

Since the maximum usable force of a brake is related to the weight on that wheel, vehicle designers adjust the braking system so that the brake force distributions coincide with the vehicle weight distribution. When a vehicle is decelerating, the forces acting on the center of gravity of the vehicle cause a weight shift. The "dynamic weight" appearing on each wheel/tire assembly is, therefore, different from the "static weight" when the vehicle is at rest.

Apparatus for testing brake performance are available, but they could be improved. For example, the results of the brake test under actual stopping conditions can depend upon the make and model of the vehicle, the actual deceleration applied to the vehicle during the test, and the static and dynamic weight distribution of the vehicle during the test. Apparatus which would take into account all these factors have heretofore been considered too complicated or too slow.

Present brake testing systems compensate for the various factors by setting broader than necessary ranges for the acceptability of the measured braking forces. In some cases these broad ranges allow vehicle brakes to "pass" which, for that particular vehicle and deceleration, should have failed.

U.S Pat. No. 5,083,456, assigned to the assignee of the present application, addresses many of these drawbacks, in part by estimating the dynamic weight distribution of the vehicle under test. Although this works extremely well for automobiles, it is less satisfactory for multi-axle vehicles such as tractor-trailer trucks where such estimation is more difficult and less accurate.

With respect to trucks, truck loading makes a significant difference in the apparent acceptability of brakes. A fully loaded truck responds very differently than a lightly loaded one. A test designed for fully loaded trucks can, therefore, fail to accurately indicate the actual condition of the brakes when the truck is tested during light load conditions.

SUMMARY OF THE INVENTION

Among the various objects and features of the present invention may be noted the provision of an improved system for testing vehicle brakes.

Another object is the provision of such a system which provides quick and accurate testing of vehicle brakes.

A further object is the provision of such a system which accurately takes into account the dynamic weight distribution of the vehicle under test without delaying test results.

A fourth object is the provision of such a system which automatically compensates for vehicular loading.

A fifth object is the provision of such a system which uses adhesion utilization for each axle as a measure of brake acceptability.

A sixth object is the provision of such a system which provides the optimum value of adhesion utilization for comparison with the actual adhesion utilization.

A seventh object is the provision of such a system which scales the optimum value of adhesion utilization with varying truck load.

Other objects and features will be in part apparent and in part pointed out hereinafter.

Briefly, a plate brake tester of the present invention includes at least one pair of weight bearing plates suitably sized to receive thereon at least one wheel/tire assembly of a vehicle as the vehicle is driven over the plates. The plates are substantially parallel. The brake force is sensed for each plate by suitable sensors and the dynamic weight of the wheel/tire assembly on each plate is directly sensed as well. The adequacy of the brakes is determined from the sensed brake force and the directly sensed dynamic weight.

In a first aspect, a method of the present invention involves testing the adequacy of the brakes of a vehicle having a left wheel/tire assembly and a right wheel/tire assembly on each axle. The method includes the steps of, for at least one axle of a vehicle under test, measuring the brake force applied by the left wheel/tire assembly of that axle of the vehicle under test, measuring the brake force applied by the right wheel/tire assembly of that axle, and determining the dynamic weight of the vehicle for that axle at the same time the brake forces for the axle are measured. The method also includes determining the adhesion utilization of the axle of the vehicle under test from the measured brake forces for that axle and the dynamic weight for that axle. The adhesion utilization is displayed as an indication of the acceptability of the brakes for that axle.

In a second aspect, a method of the present invention includes the steps of, for at least one axle of a vehicle under test, determining the adhesion utilization for that axle when the brakes are applied, determining the deceleration of the vehicle when the brakes are applied, comparing the adhesion utilization for that axle with the deceleration of the vehicle, and rejecting the brakes on that axle as inadequate if the adhesion utilization for that axle differs from the deceleration more than a preset amount.

In a third aspect, a method of the present invention includes the steps of, for at least one axle of a vehicle under test, determining the adhesion utilization for that axle when the brakes are applied, determining the deceleration of the vehicle when the brakes are applied, using the deceleration to determine an ideal value of the adhesion utilization for that axle, weighing the vehicle, scaling the ideal value of the adhesion utilization as a function of the measured weight of the axle and the gross vehicle weight rating for that particular axle, and accepting the brakes under test as adequate if the adhesion utilization for that axle falls within a preset amount of the scaled ideal value of the adhesion utilization determined from the deceleration of the vehicle and the actual weight and weight rating for that axle.

BRIEF DESCRIPTION OF THE DRAWINGS

FIG. 1 is a simplified top plan of the plate brake tester of the present invention;

FIG. 2 is a front elevation of a console which is part of the tester of FIG. 1;

FIG. 3 is a block diagram illustrating the electrical portions of the tester of FIG. 1;

Similar reference characters indicate similar parts throughout the several views of the drawings.

DESCRIPTION OF THE PREFERRED EMBODIMENT

Figure 4:
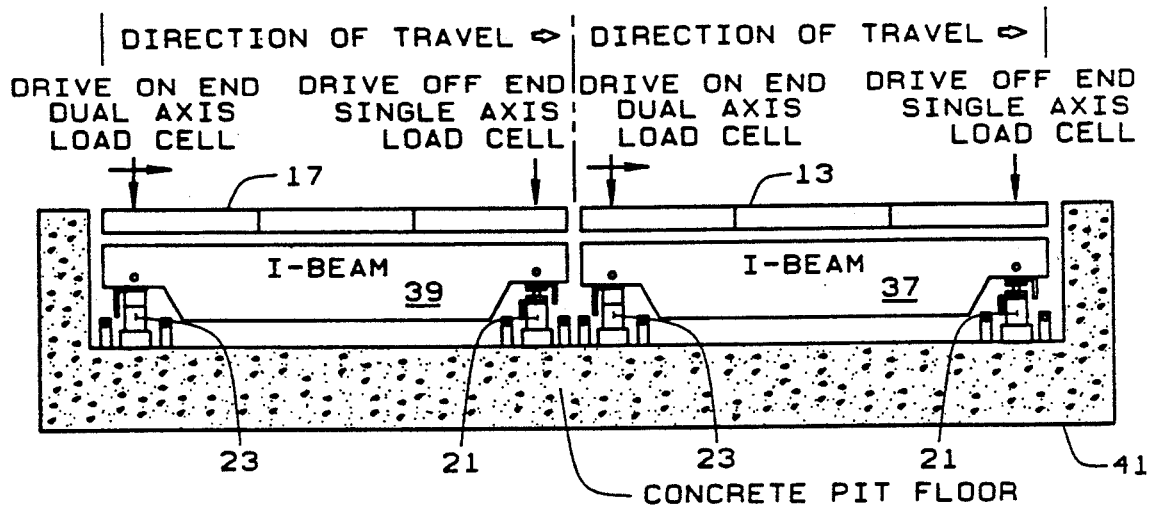
FIG. 4 is a side elevation of the mechanical aspects of the tester of FIG. 1.

Turning now to FIG. 1, a plate brake tester 11 of the present invention is shown which includes a first set of substantially parallel plates 13, 15 and a second set of substantially parallel plates 17, 19 disposed to the rear with respect to the first set. The plates are mounted substantially flush with the surface of the floor and are sized to receive the wheel/tire assemblies of a vehicle, such as a multi-axle truck, as the vehicle is driven over the plates. The number of plates may be varied depending upon how many axles of the vehicle are to be tested at one time. Each plate is preferably constructed of serrated bar grating.

Each plate has associated therewith a pair of load cell transducers 21, 23 disposed at the forward and rearward ends of the plates respectively. The transducers, as seen below, are suitably mounted below the plates and sense the various forces exerted on the plate by the vehicle under test.

The transducers of each plate are connected to a sensor circuit 25, also suitably mounted underneath its respective plate. Although the particular transducers used are not a feature of the present invention, those sold under the numbers 58-10525-004 and 58-10525-003 by Stress-Tek of Renton, Washington have been found to be suitable. These transducers have a capacity of at least 10,000 lb. for each axis, an input/output impedance of 345 ohms minimum, and an output of 1.5 mV/V. Other transducers, and corresponding suitable sensor circuits could be used as well.

All the sensor circuits 25 are electrically cabled to a console 27, disposed to the side of the plates. Console 27, see FIG. 2, includes the electrical circuitry described below for determining brake adequacy from the sensor outputs, as well as a display 29 (preferably a CRT display), an input device such as a keyboard 31, and a printer 33.

The electrical connections between the various component parts of the present invention are indicated in block diagram form in FIG. 3. The sensors 25, display 29, keyboard 31, and printer 33 are all suitably connected to a computer 35 operated under programmed control. As is well-known, such computers include memory, interface devices, and logic units which are not shown in FIG. 3 for purposes of clarity. Computer 35 is readily embodied in a microcomputer which fits easily within console 27.

Turning to FIG. 4, the mechanical aspects of the plate brake tester 11 are illustrated in greater detail. Plates 13, 17 (and 15, 19 which are not shown in FIG. 4) are disposed on respective I-beams 37, 39 which transfer the forces from the plates to load cells 21 and 23 for each plate. Each load cell is suitably mounted to the floor of a concrete pit 41 which may be suitably formed in the floor of the testing area.

Load cells 21 and 23 are different in construction and function. Load cells 21, disposed at the forward end of each plate, are single axis load cells which are responsive only to vertical forces (the weight sensed at that end of the plate). Load cells 23, disposed at the rearward end of each plate, are dual axis load cells which have a first output responsive to vertical force (weight) applied to that portion of the plate and having a second output responsive to horizontal force applied to the plate. The horizontal force is the braking force from the wheel/tire assembly disposed on that plate.

Figure 5:
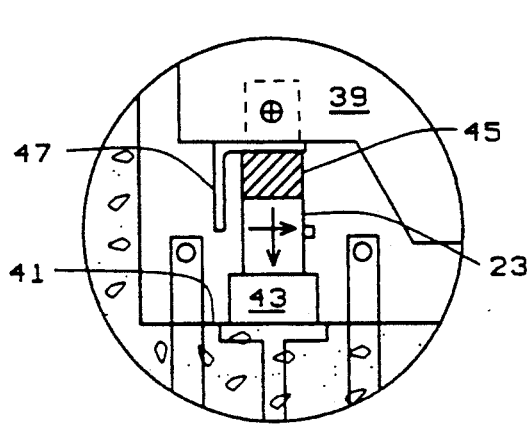
FIG. 5 is an enlarged view of a portion of FIG. 4.

As can be seen in FIG. 5, the dual axis load cell is disposed between a mounting block 43 and a support spacer bar 45. A top plate support angle 47 having a rearwardly depending skirt is disposed between spacer bar 45 and I-beam 39. With this particular mechanical arrangement, dual axis load cell 23 is responsive to both vertical and horizontal forces.

Figure 6:
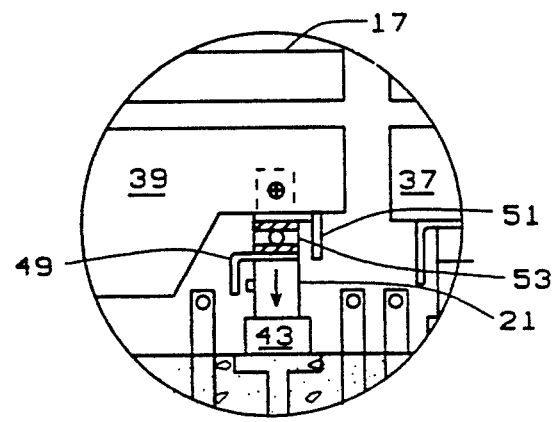
FIG. 6 is an enlarged view similar to FIG. 5 of another portion of FIG. 4.

Turning to FIG. 6, single axis load cell 21 is mounted somewhat differently so that it is responsive only to vertical forces. Specifically, the mounting differs from described above in that a lower support angle 49 having a rearwardly depending skirt is disposed immediately above single axis load cell 21 while a upper support plate assembly 51 is disposed immediately below I-beam 39. A bearing 53 is disposed between plate assembly 51 and support angle 49 to remove all horizontal forces from the forward mounting of the plates. As a result, load cell 21 is responsive only to vertical forces.

Figure 7:
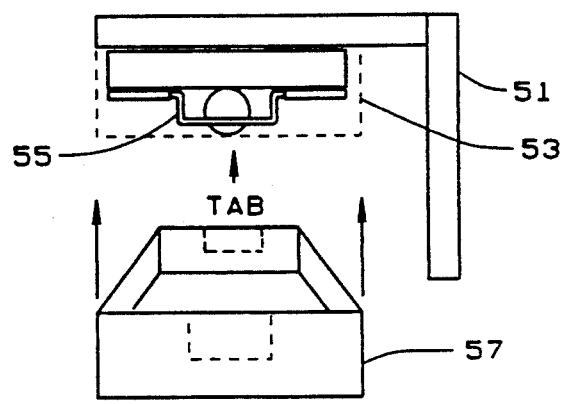
FIG. 7 is an enlarged view of a portion of FIG. 6.

As shown in more detail in FIG. 7, a bearing retainer 55 is used to hold bearing 53 in place, while a rubber bearing seal 57 provides suitable means for ensuring that the bearing remains properly greased.

Figure 8:
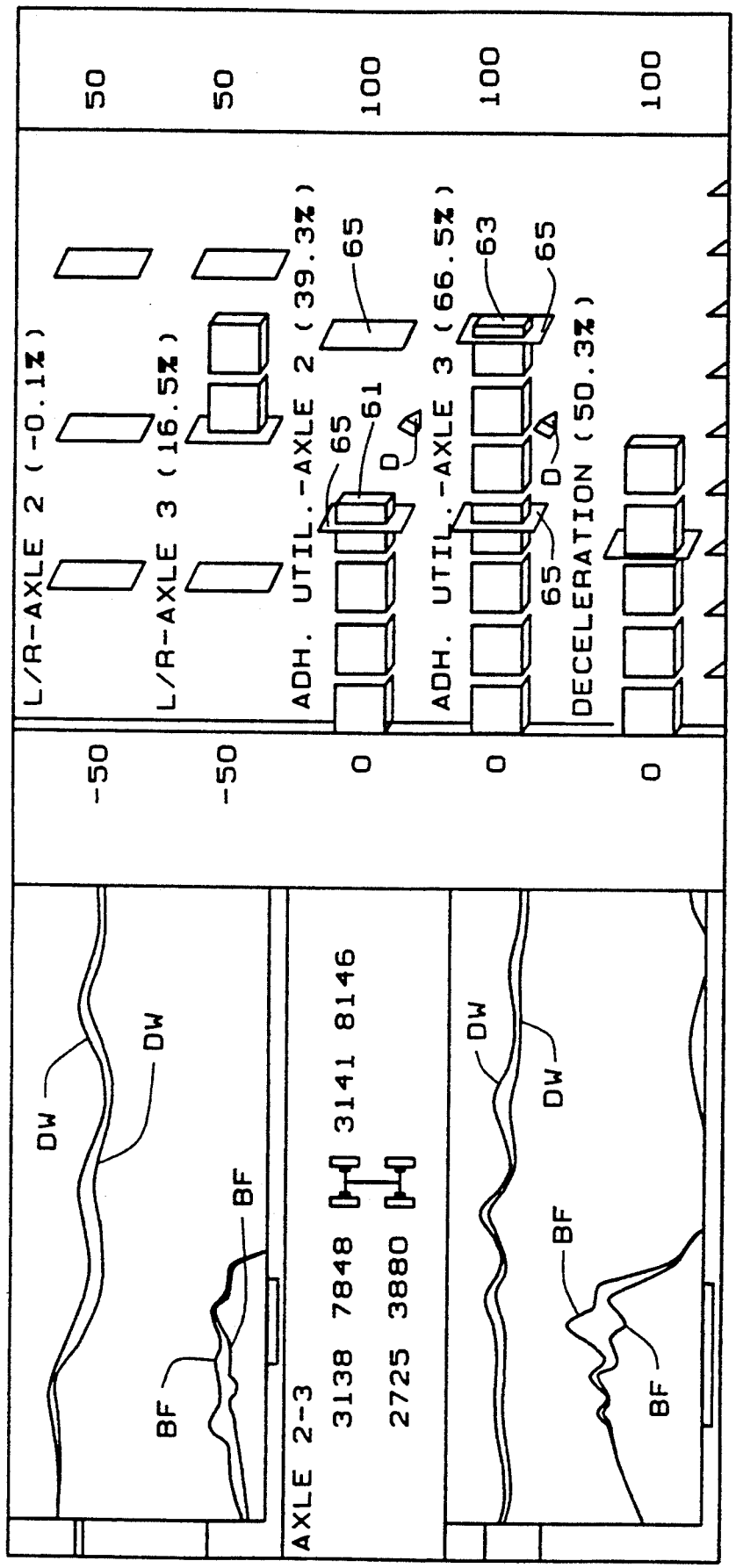
FIG. 8 is a view illustrating the output of the brake plate tester of FIG. 1.

In operation, computer 35 uses the outputs of sensors 25 to determine several characteristics of the vehicle under test. The results are displayed to the user by CRT display 29 and printer 33. A typical display is shown in FIG. 8. The brake force applied by each wheel/tire assembly to its respective plate is sensed by the dual axis load cell for that plate and the corresponding output is supplied to computer 35. The brake force is not constant, but varies with time, as shown by the curves labelled BF in FIG. 8. The dynamic weight for each plate is obtained by summing the vertical forces sensed by the load cells. The dynamic weight is also not constant, as is shown in the curves labelled DW. These brake force and dynamic weight curves are stored for display as shown in FIG. 8.

It has been found that the sum of the maximum brake forces for an axle, divided by the dynamic weight for that axle, is a good indicator of brake adequacy. This indicator, called adhesion utilization, is readily determined by computer 35. First, computer 35 identifies the maximum brake force for the left and right wheel/tire assemblies on a particular axle, as measured by sensors 25. These brake forces are summed. The computer also takes the dynamic weight values corresponding in time to the maximum braking forces. These dynamic weights are also summed, and the left and right brake forces are divided by the sum of the dynamic weights. The result, the adhesion utilization, varies from 0–100%, and is dimensionless.

It has also been found that the adhesion utilization in the ideal situation should be equal for each axle, and should equal the deceleration of the vehicle expressed as a percentage of g, the acceleration due to gravity. When the adhesion utilization for each axle is equal, no axle locks up before the others, thereby providing maximum safe braking. If these adhesion utilizations for the various axles are equal, it has been discovered that they should equal the deceleration. The computer 35 calculates and displays deceleration (actually maximum deceleration) since it knows both the total braking force and the total weight of the vehicle. The display of deceleration is shown in the lower righthand corner of FIG. 8.

Since for maximum brake efficiency, the adhesion utilization should equal the deceleration, computer 35 also displays an indicator D representing the measured deceleration adjacent bar graphs 61, 63 on which are displayed the values of adhesion utilization for the respective axles. Computer 35 also displays limit indicators 65 spaced a preset amount from the deceleration indicator D. As the deceleration changes, as it does from test to test, the indicators D and 65 move with it.

As can be seen in FIG. 8, neither axle has an adhesion utilization particularly close to the ideal value marked by indicator D. The adhesion utilization of axle 2 is within the limits, while the adhesion utilization of axle 3 exceeds the upper limit, represented by rightmost indicator 65. The brakes on axle 3 are therefore rejected as inadequate, while those of axle 2 are accepted as adequate.

It has been found that trucks with satisfactory brakes sometimes exceed the limits discussed above when the truck is tested in an empty or partially loaded state. This is because the braking necessary to stop a full load is too much for the situation when the truck is empty. To address this situation, computer 35 scales the ideal adhesion utilization by taking into account the actual and gross rated weights of the truck. The gross axle weight rating of the truck may be a default setting of computer 35, or the operator may use keyboard 31 to enter such a rating. The actual weight of the truck axle under test is obtained from sensors 25. The adhesion utilization ideal value is then scaled by computer 35 by multiplying the rating by a constant and dividing the product by the actual truck axle weight. This ensures that adequate brakes are not mistakenly rejected.

From the above it will be seen that the various objects and features of the present invention are achieved and other advantageous results obtained. The embodiments described above are illustrative and are not to be taken in a limiting sense.

What is claimed is:

1. A plate brake tester for testing the adequacy of the brakes of a vehicle comprising:

at least one pair of weight bearing plates suitably sized to receive thereon at least one wheel/tire assembly of a vehicle as the vehicle is driven over the plates, said pair of weight bearing plates being substantially parallel;

means for sensing, for each plate, the brake force applied by a brake associated with the wheel/tire assembly disposed on that plate and for directly sensing the dynamic weight of the wheel/tire assembly on each plate during braking; and means operatively connected to the sensing means for determining from the brake force and the directly sensed dynamic weight the adequacy of the brakes of the vehicle under test.

2. The plate brake tester as set forth in claim 1 wherein the brake tester includes a pair of weight bearing plates for each axle whose brakes are to be tested.

3. The plate brake tester as set forth in claim 1 wherein the sensing means includes at least a pair of load cells for each plate, spaced longitudinally along the plate, the outputs of said pair of load cells representing the dynamic weight of the wheel/tire assembly disposed on the corresponding plate.

4. The plate brake tester as set forth in claim 3 wherein at least one of the load cells per plate is a dual axis load cell having one output representing vertical force applied to that plate and having a second output representing horizontal force applied to that plate, the horizontal force being the braking force from the wheel/tire assembly disposed on that plate.

5. The plate brake tester as set forth in claim 1 wherein the dynamic weight varies during the test, further including means for recording dynamic weight values during the test.

6. The plate brake tester as set forth in claim 1 wherein the braking force varies during the test, further including means for recording braking force during the test.

7. The plate brake tester as set forth in claim 1 wherein the determining means includes means for determining for each plate the maximum value of brake force during the test, and means for selecting the dynamic weight value for each plate corresponding to the maximum value of brake force for that plate, said determining means including means to determine the adequacy of the brakes from the maximum brake force values and the corresponding dynamic weight values.

8. The plate brake tester as set forth in claim 1 wherein the determining means includes means for determining the adhesion utilization for each axle being tested.

9. The plate brake tester as set forth in claim 8 wherein the determining means includes means for determining the maximum deceleration on the vehicle resulting from the application of the brakes during the test, said determining means being responsive to the maximum deceleration to set a preferred value for the adhesion utilization for each axle under test.

10. The plate brake tester as set forth in claim 9 wherein the determining means further includes means for determining acceptable limits for the adhesion utilization of each axle from the preferred value of adhesion utilization.

11. The plate brake tester as set forth in claim 10 further including means for displaying the measured adhesion utilization, the ideal value of adhesion utilization, and the acceptable limits for adhesion utilization in graphical form.

12. The plate brake tester as set forth in claim 9 including means for manually inputting the gross axle weight rating for the axle under test, the determining means being responsive to said gross axle weight rating and the static weight of the axle to scale the preferred value of adhesion utilization to compensate for partial loading of the vehicle.

13. A method of testing the adequacy of the brakes of a vehicle having a left wheel/tire assembly and a right wheel/tire assembly on each axle, comprising the steps of:
- for at least one axle of a vehicle under test, measuring the brake force applied by the left wheel/tire assembly of that axle of the vehicle under test, measuring the brake force applied by the right wheel/tire assembly of that axle, and determining the dynamic weight of the vehicle for that axle at the same time the brake forces for the axle are measured;
- determining the adhesion utilization of the axle of the vehicle under test from the measured brake forces for that axle and the dynamic weight for that axle;
- displaying said adhesion utilization as an indication of the acceptability of the brakes for that axle.

14. The method of testing the adequacy of the brakes of a vehicle as set forth in claim 13 wherein the brake forces applied by the brakes during the test vary with time, further including taking a plurality of brake force measurements during each test and selecting the maximum brake force value for each wheel/tire assembly under test.

15. The method of testing the adequacy of the brakes of a vehicle as set forth in claim 14 wherein the dynamic weight for each wheel/tire assembly under test varies with time, further including determining a plurality of dynamic weight values for each wheel/tire assembly under test.

16. The method of testing the adequacy of the brakes of a vehicle as set forth in claim 15 wherein the step of determining the adhesion utilization of the axle of the vehicle under test includes selecting the maximum values of brake force and the corresponding value of dynamic weight to determine the adhesion utilization.

17. The method of testing the adequacy of the brakes of a vehicle as set forth in claim 16 wherein the adhesion utilization of an axle under test is the sum of the maximum brake force applied by the left wheel/tire assembly and the maximum brake force applied by the right wheel/tire assembly, divided by the corresponding dynamic weight of the left and right wheel/tire assemblies.

18. The method of testing the adequacy of the brakes of a vehicle as set forth in claim 13 further including determining the deceleration on the vehicle during the test and selecting a preferred value of the adhesion utilization which is a function of the deceleration.

19. The method of testing the adequacy of the brakes of a vehicle as set forth in claim 18 wherein the preferred value of the adhesion utilization equals the deceleration.

20. The method of testing the adequacy of the brakes of a vehicle as set forth in claim 18 further including scaling the preferred value of the adhesion utilization as a function of the static weight of the vehicle axle and the gross weight rating of the axle.

21. A method of testing the adequacy of the brakes of a vehicle, comprising the steps of:
- for at least one axle of a vehicle under test, determining the adhesion utilization for that axle when the brakes are applied;
- determining the deceleration of the vehicle when the brakes are applied;
- comparing the adhesion utilization for said axle with the deceleration of the vehicle;
- rejecting the brakes on said axle as inadequate if the adhesion utilization for that axle differs from the deceleration more than a preset amount.

22. A method of testing the adequacy of the brakes of a vehicle, comprising the steps of:
- for at least one axle of a vehicle under test, determining the adhesion utilization for that axle when the brakes are applied;
- determining the deceleration of the vehicle when the brakes are applied;
- using the deceleration to determine an ideal value of the adhesion utilization for said axle;
- weighing the vehicle;
- scaling the ideal value of the adhesion utilization as a function of the measured weight of the axle and the gross vehicle weight rating for that particular axle;
- accepting the brakes under test as adequate if the adhesion utilization for said axle falls within a preset amount of the scaled ideal value of the adhesion utilization determined from the deceleration of the vehicle and the actual weight and weight rating for that axle.

* * * * *